United States Patent
Rodriguez et al.

[11] Patent Number: 5,918,538
[45] Date of Patent: Jul. 6, 1999

[54] FOOD CUTTING APPARATUS

[75] Inventors: Rudolph Rodriguez; Ernest Rodriguez; Raul Rodriguez; Charles M. Rodriguez, all of Fort Worth, Tex.

[73] Assignee: Palo Verde Partnership, Fort Worth, Tex.

[21] Appl. No.: 09/039,997

[22] Filed: Mar. 17, 1998

[51] Int. Cl.$^6$ .............................. A23L 1/00; A21C 9/00; A21C 11/00; A23P 1/00

[52] U.S. Cl. ................................ 99/489; 83/155; 83/932; 99/537

[58] Field of Search ............................. 99/334, 335, 349, 99/353–355, 386, 443 C, 485, 486, 489, 492, 537, 538, 450.1, 450.2, 450.6; 83/155, 157, 215, 266, 350, 673, 932; 425/298, 315, 466, 308, 376.1, 192 R; 426/502, 503, 389

[56] References Cited

U.S. PATENT DOCUMENTS

| | | | |
|---|---|---|---|
| 3,748,079 | 7/1973 | Moreno et al. | 99/489 X |
| 3,880,064 | 4/1975 | Martinez | 99/349 |
| 3,901,137 | 8/1975 | Jimenez | 99/353 |
| 4,104,958 | 8/1978 | Manser et al. | 425/308 |
| 4,405,298 | 9/1983 | Blain | 99/450.1 |
| 4,938,126 | 7/1990 | Rubio et al. | 99/443 C |
| 5,012,726 | 5/1991 | Fehr et al. | 99/450.6 |
| 5,287,781 | 2/1994 | Fehr et al. | 83/155 |
| 5,392,698 | 2/1995 | Sprecher et al. | 99/386 X |
| 5,549,467 | 8/1996 | Schultz | 83/673 X |
| 5,592,870 | 1/1997 | Sanchez et al. | 99/353 |
| 5,635,235 | 6/1997 | Sanchez et al. | 426/503 X |
| 5,687,641 | 11/1997 | Williamson et al. | 99/450.2 |

*Primary Examiner*—Timothy F. Simone
*Attorney, Agent, or Firm*—Arthur F Zobal

[57] ABSTRACT

The apparatus of the invention has a food receiving apparatus including a cutting device with a cylinder operated plunger. Also provided is a conveyor having a continuous belt for carrying a stack of tortillas or the like to the food receiving apparatus. A detector is provided for detecting the stack of tortillas or the like as it enters the food receiving apparatus. The detector actuates a control system which causes the cylinder to move the plunger toward the cutting device for compressing the tortillas against the cutting device for cutting the tortillas to the desired shape. The plunger then moves away from the food receiving apparatus.

5 Claims, 10 Drawing Sheets

FOOD CUTTING APPARATUS

BACKGROUND OF THE INVENTION

1. Field of the Invention

The invention relates to an automatic food cutting apparatus.

2. Description of the Prior Art

Large annular tortillas have been cut into smaller pieces by hand which is a time consuming process.

SUMMARY OF THE INVENTION

It is an object of the invention to provide a new and use apparatus for automatically cutting large tortillas or the like into smaller pieces for use in restaurants, etc.

The apparatus has a food receiving means including a cutting means with a cylinder operated plunger. Also provided is a conveyor having a continuous belt for carrying a stack of tortillas or the like to the food receiving means. A detecting means is provided for detecting the stack of tortillas or the like as it enters the food receiving means. The detecting means actuates a control means which causes the cylinder to move the plunger toward the cutting means for compressing the tortillas against the cutting means for cutting the tortillas to the desired shape. The plunger then moves away from the food receiving means.

DESCRIPTION OF THE PREFERRED EMBODIMENTS

Figure 1:
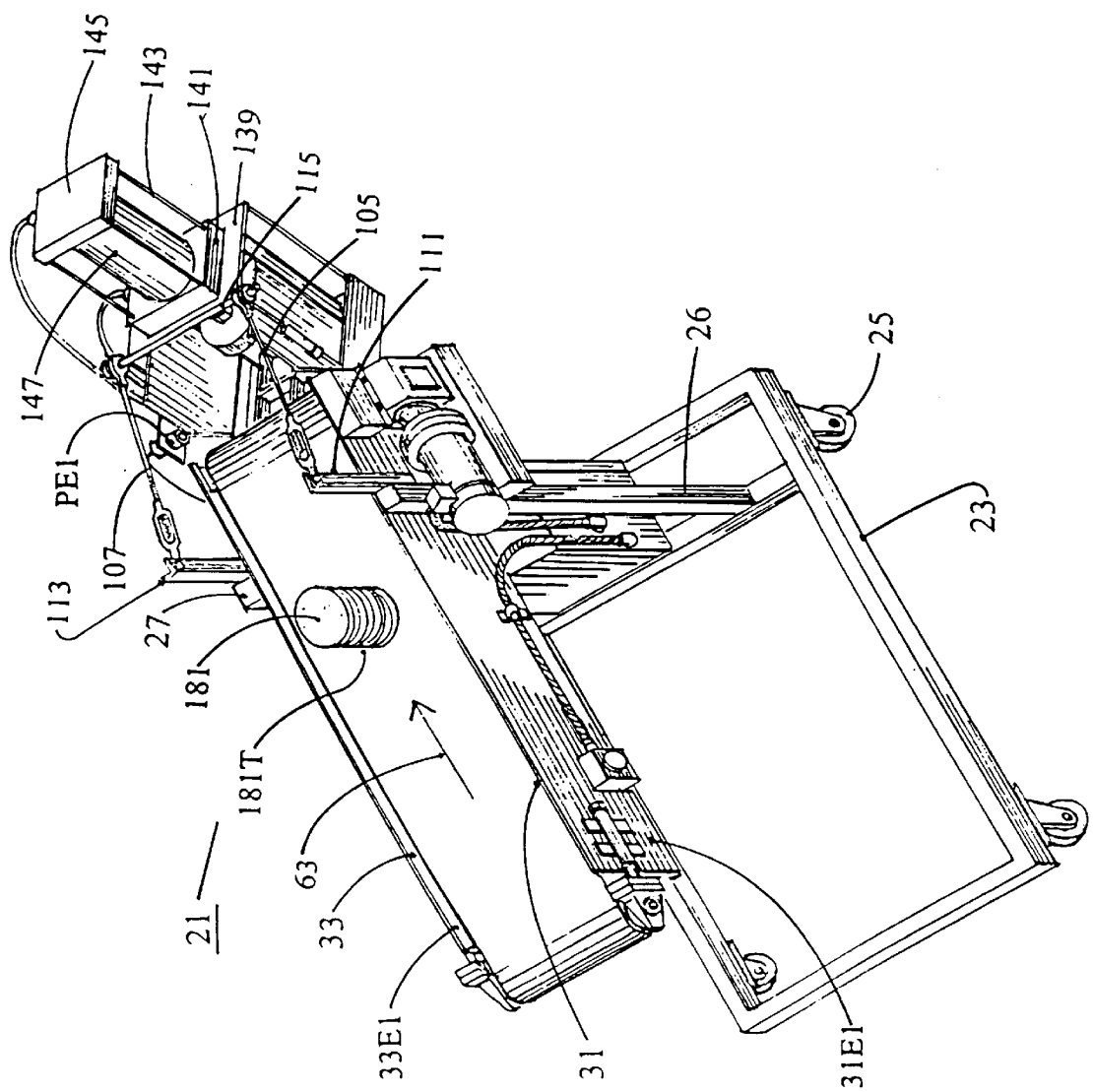
FIG. 1 is an isometric view of the apparatus of the invention looking downward.
Figure 2:
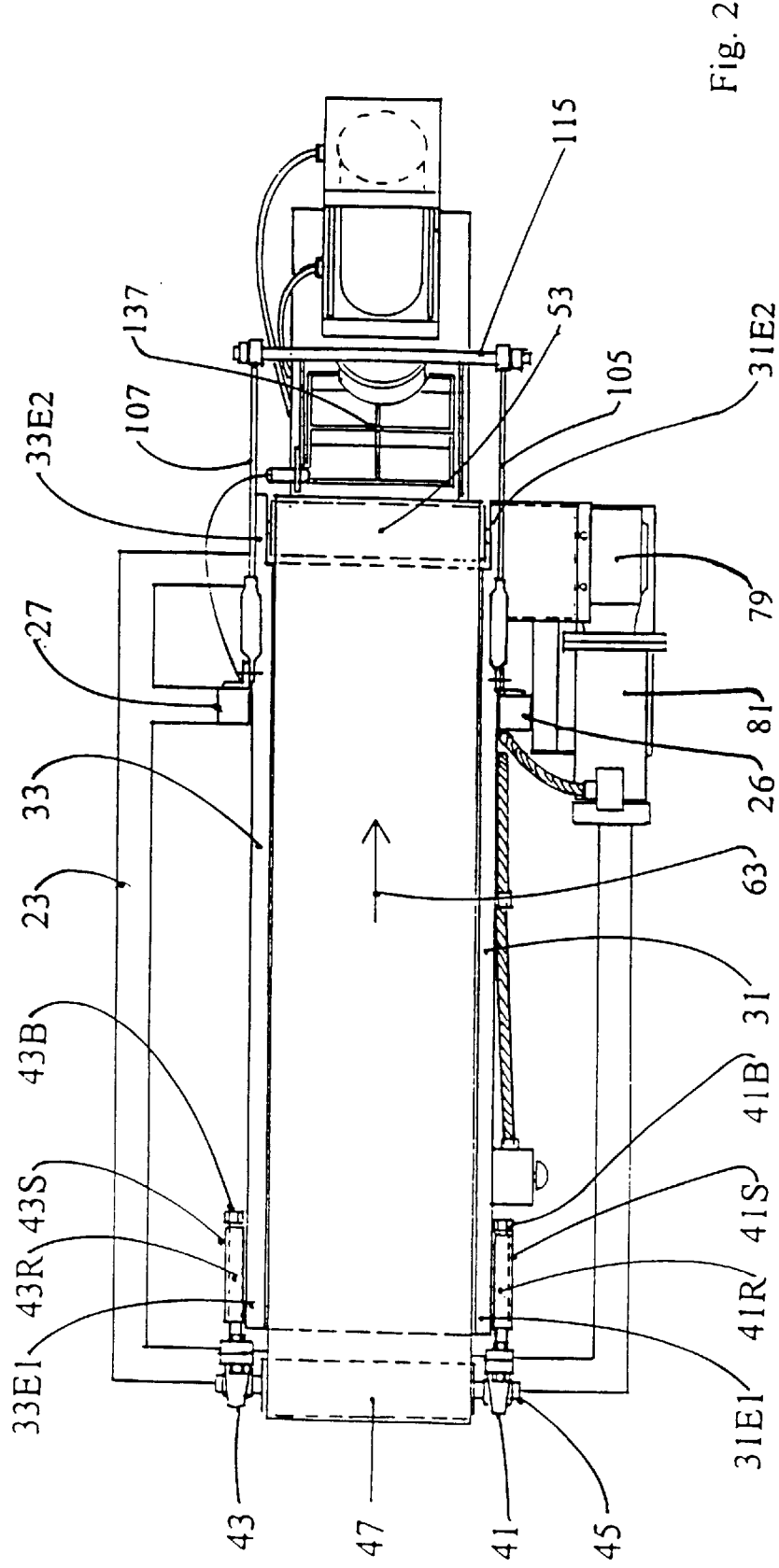
FIG. 2 is a top plan view of the apparatus of the invention.
Figure 3:
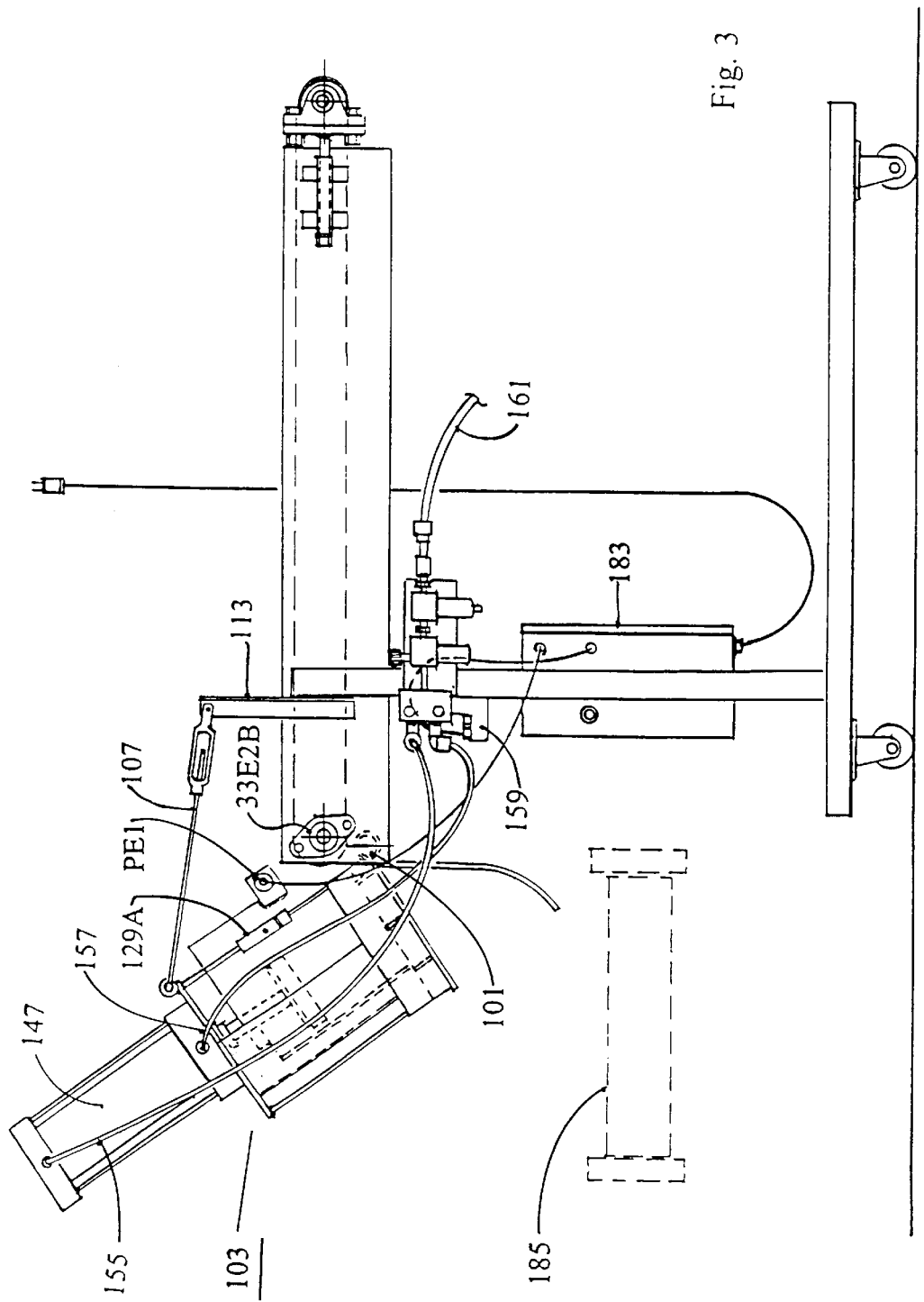
FIG. 3 is a side view of the apparatus as seen from the left side of FIG. 2.
Figure 4:
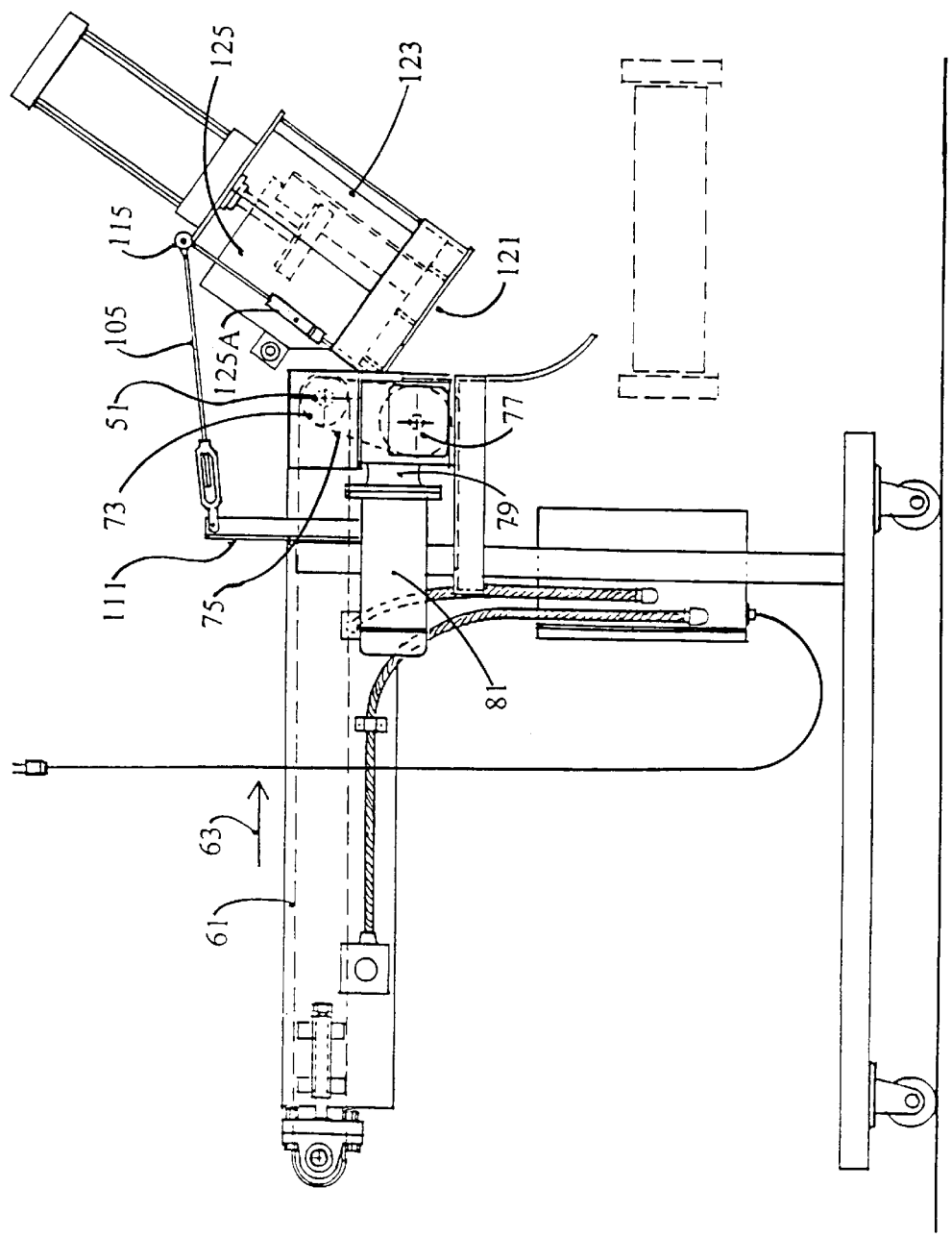
FIG. 4 is a side view of the apparatus as seen from the right side of FIG. 2.

Referring now to the drawings the apparatus of the invention is identified by reference numeral 21. It comprises a lower rectangular metal frame 23 supported horizontally by wheels 25. Two spaced apart metal frame members 26 and 27 extend upward from the frame 23. Connected to the upper ends of frame members 26 and 27 are two spaced apart metal plate members 31 and 33 having upper and lower edges which are parallel with frame 23. Coupled to ends 31E1 and 33E1 of plates 31 and 33 are two pillow block members 41 and 43 which rotatably support a shaft 45 which in turn supports a roller 47. The members 41 and 43 have rods 41R and 43R coupled thereto which are located in sleeves 41S and 43S which are connected to the plates 31 and 33. The other ends of the rods 41R and 43R are threaded and bolts 41B and 43B are screwed to the ends of the rods 41R and 43R to allow the rods 41R and 43R and hence members 41 and 43 and the shaft 45 to be adjusted to positions toward or away from the frame members 26 and 27.

The other ends 31E2 and 33E2 of the plates 31 and 33 have rotatable bearing 33E2B to support a shaft 51 which in turn supports a roller 53. Only one of the bearing 33E2B is shown.

A continuous belt 61 extends around the rollers 47 and 53. A sprocket 73 is connected to the shaft 51. A chain 75 extends around the sprocket 73 and around a drive sprocket 77 which is coupled to a speed reducer 79 which is driven by a DC electric motor 81. The motor 81 is operated to rotate the roller 53 in a direction such that the top of the belt 61 moves in the direction of the arrow 63.

Pivotally coupled to a rod 101 (which is connected to the plates 31 and 33) is the lower end of a food receiving apparatus 103. Turn buckles 105 and 107 are pivotally connected to angle supports 111 and 113 which are rigidly connected to frame members 26 and 27 and to a rod 115 which is connected to the apparatus 103.

The apparatus 103 has a lower end with an opening 121, a curved semi-circular rear side wall 123 with interior adjustable side walls 125, 127, and 129 defining a food entrance 131.

Figure 5:
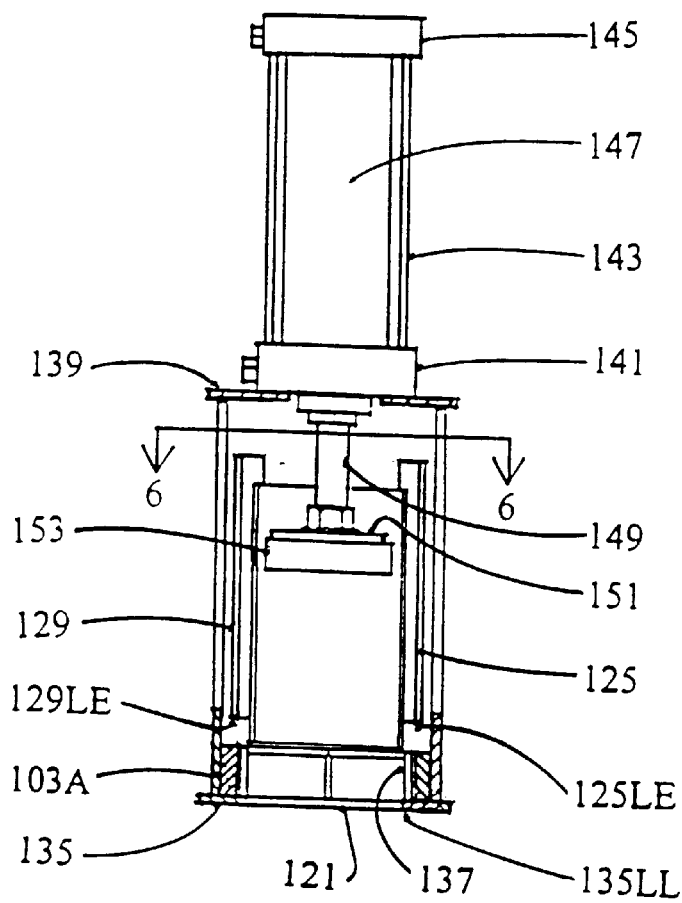
FIG. 5 is a front plan cross-sectional view of the food receiving apparatus.
Figure 7:
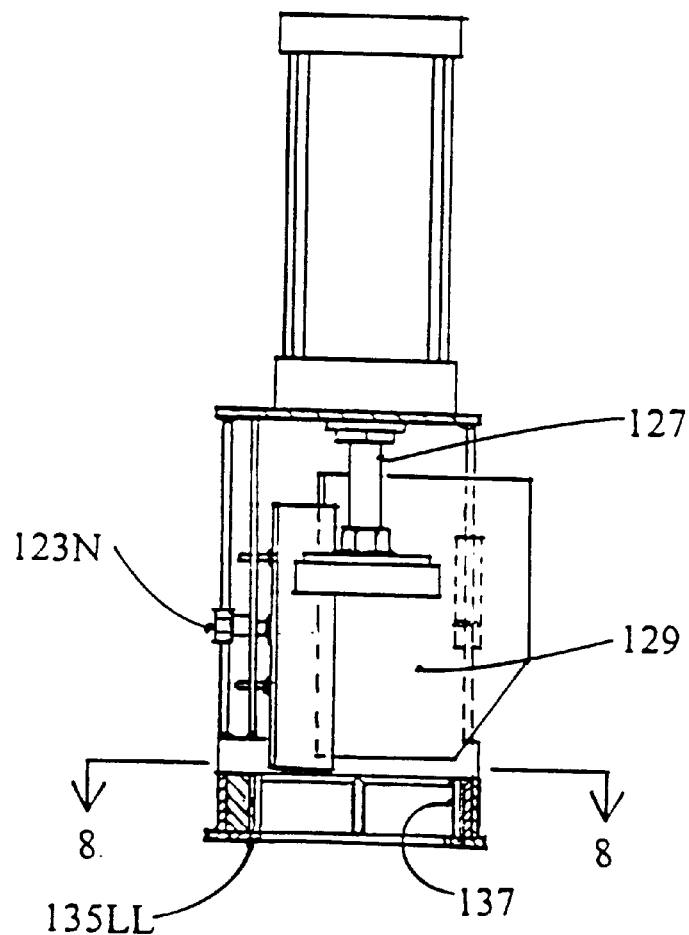
FIG. 7 is a side view of the food receiving apparatus as seen in FIG. 3 with some of the components removed.
Figure 8:
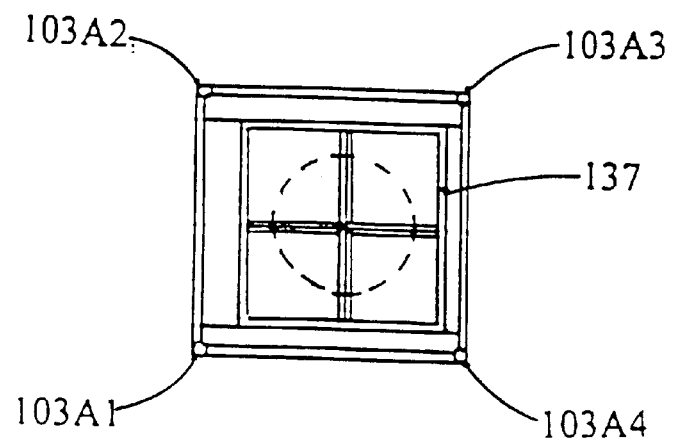
FIG. 8 is a cross sectional view of FIG. 7 as seen along lines 8—8 thereof.
Figure 12:
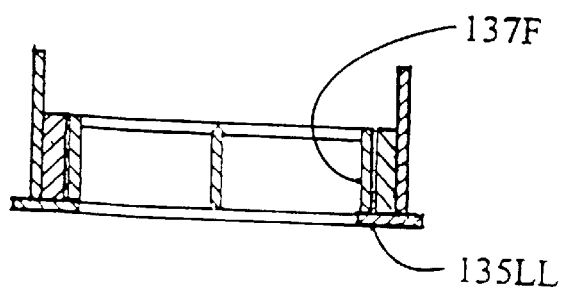
FIG. 12 is a partial cross sectional view of the lower end of the food receiving apparatus.
Figure 13:
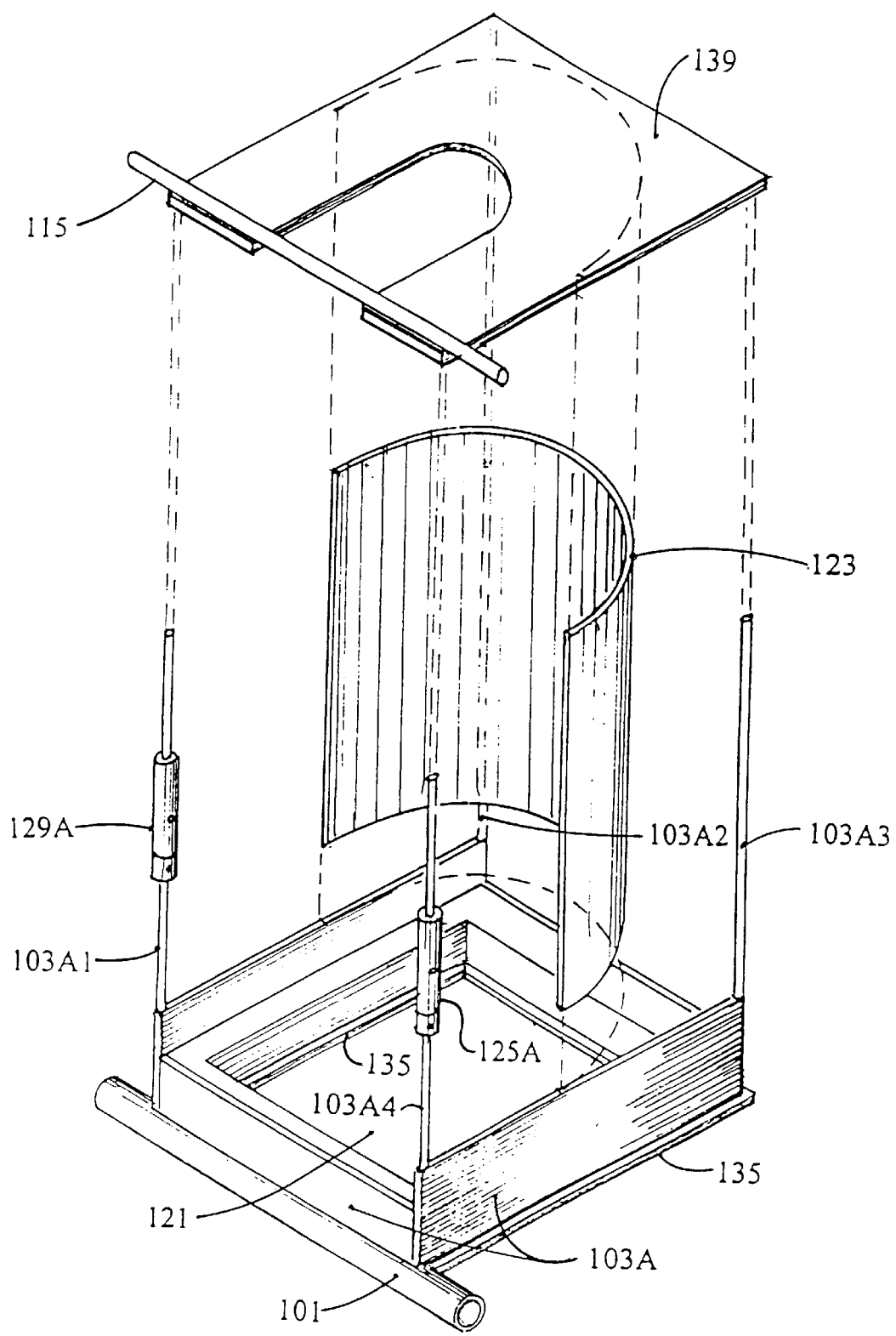
FIG. 13 is an exploded view of the food receiving apparatus.

The apparatus 103 has a basic frame consisting of a rectangular lower end 103A with an opening 121, four vertical rods 103A1, 103A2, 103A3, and 103A4 and a semi-circular rear wall 123 supporting top plate 139. The lower end of wall 123 is connected to the lower end 103A of the frame. Interior adjustable rear and side walls 125, 127, and 129 provide food entrance and positioning. Wall 127 is coupled to fixed wall 123 by a threaded rod and 123N nut for front/rear adjustment. Side walls 125 and 129 are connected to adjustment rods 125A and 129A which are vertically slidable on rods 103A4 and 103A1. Rods 125A and 129A can be secured to rods 103A4 and 103A1 at different vertical positions by way of set screws (not shown). The walls 125 and 129 have their lower edges 125LE and 129LE spaced upward from the lower inner edge of lower end 103A. A lower wall 135 is coupled to the lower edge of lower end 103A and forms an inward lower ledge 135LL for removably supporting a blade member identified at 137 in FIGS. 2, 5, 7, 8, and 10–12. The blade member 137 has blades 137B in the form of a cross connected inside of a square frame 137F with openings 137(O) between the blades. The blade member 137 can be inserted into the entrance 131 with its frame 137F and supported by the lower ledge 135LL as shown in FIGS. 5, 7, and 12.

Attached to the tops of wall 123 and structure 103A1, 103A2, 103A3, 103A4 is a top wall 139 to which is attached structural member 141. Rods 143 are attached to member 141 and to member 145 which support a pneumatic cylinder 147 having a piston 149. A plate 151 is attached to the lower end of the piston 149 and a cushion member 153 is attached to the lower end of the plate 151. The member 153 may be formed of high density polyethylene. Air hoses 155 and 157 are coupled to the top and bottom of the cylinder 147 and to a solenoid valve 159 with an air supply hose 161 coupled to the valve 159 for operating the piston 149.

Figure 6:
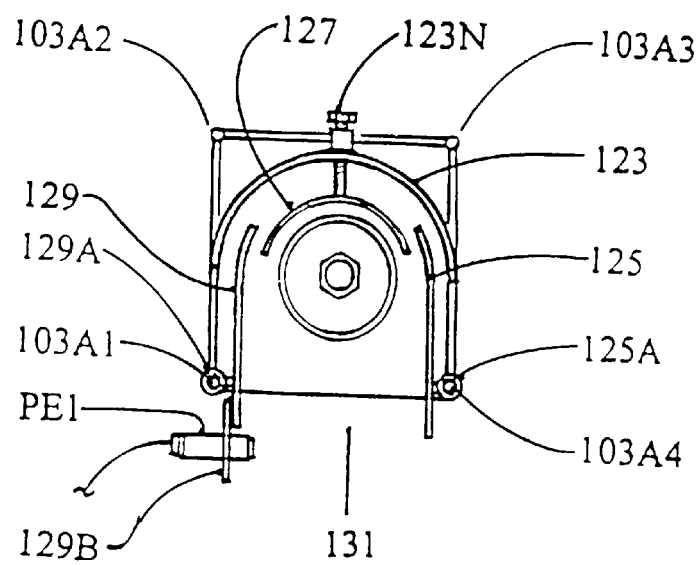
FIG. 6 is a cross sectional view of FIG. 5 as seen along lines 6—6 thereof.

Also provided is a photo electric (infra red) detecting device PE1 for detecting the presence of the tortillas on the belt 61 as they leave the belt 61 and enter the entrance 131 of the food receiving apparatus 103. As shown in FIG. 6, the device PE1 is connected to an extension 129B of the wall 129.

In operation, a stack 181 of soft round pre-cooked tortillas 181T are placed on the belt 61 as shown in FIG. 1 and the motor 81 is actuated to cause the belt 61 to move in the direction of the arrow 63 to move the tortillas toward the food receiving apparatus 103. When the stack 181 of tortillas is detected by the photoelectric device PE1, the control system in the cabinet 183 allows the tortillas to be moved into the entrance 131 onto the blades 137B of the blade member 133. After a short period of time, the solenoid 159 is actuated to allow air to flow in hose 155 and out of hose 157 to move the piston 149 and cushion member 153 downward onto the stack 181 of tortillas to compress them against the blades 137B and hence to cut them in shapes determined by the blades 137B. The cut or severed tortilla pieces fall through the opening 137(O) between the blades and through the opening 121 of the apparatus 103 on to a lower conveyor 183 which carry them to a separator, and packing means. The cut tortilla pieces may be cooked further by others.

Figure 9:
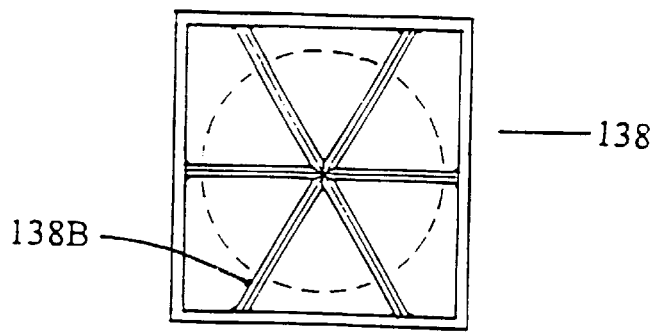
FIG. 9 is a plan view of one embodiment of the cutting blades of the food receiving apparatus.
Figure 10:
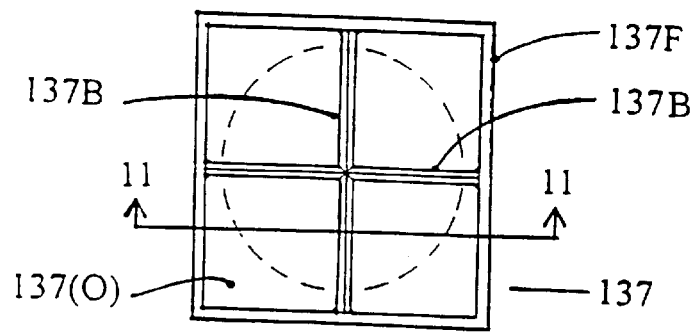
FIG. 10 is a plan view of another embodiment of the cutting blades of the food receiving apparatus.
Figure 11:
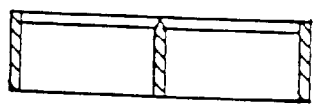
FIG. 11 is a cross sectional view of FIG. 10 as seen along lines 11—11 thereof.

FIG. 9 illustrates another type of blade 138 member having six blades 138B rather than 4.

Figure 14A:
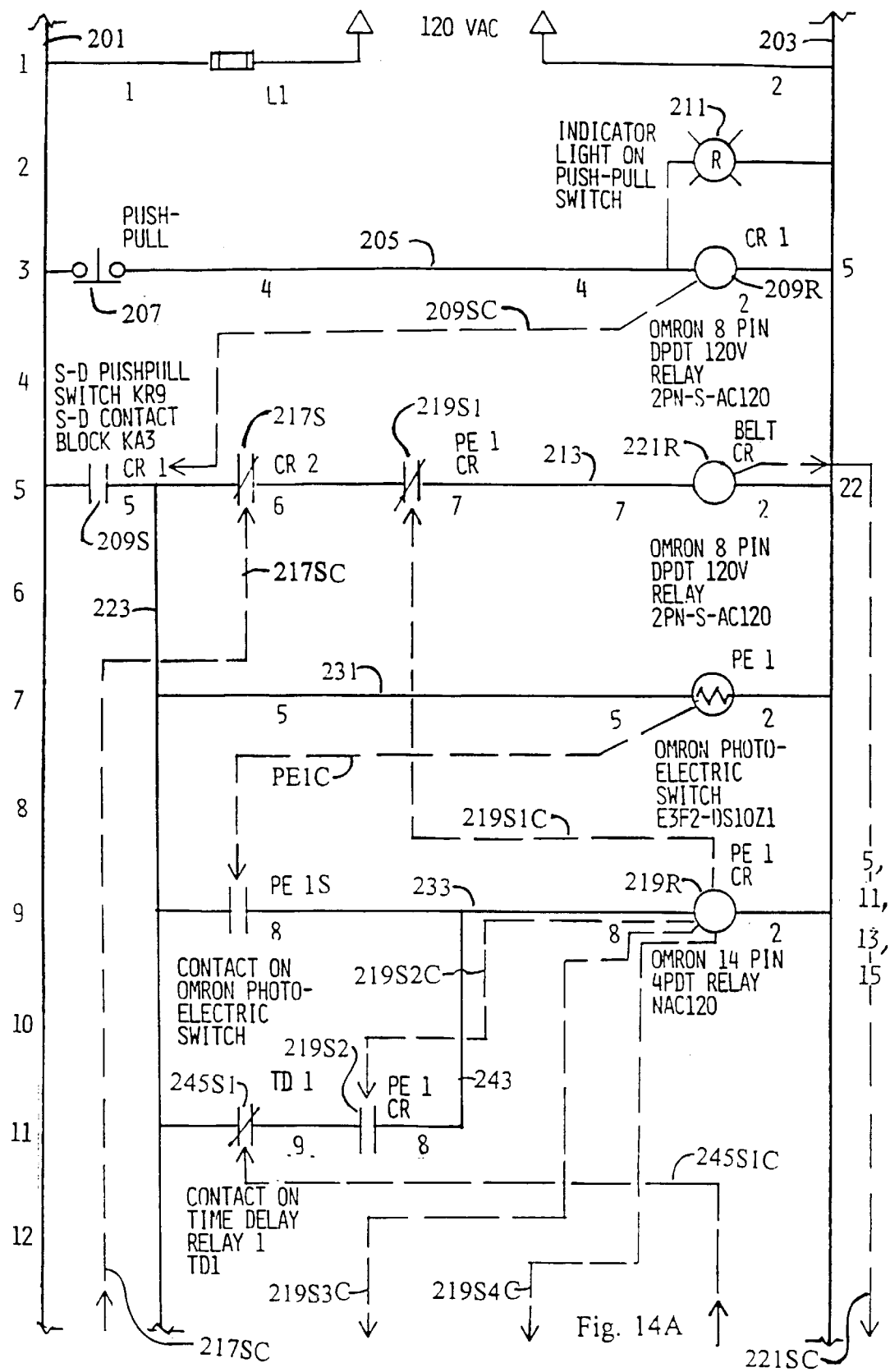
FIGS. 14A and 14B are an electrical schematic of the system for operating the apparatus of the invention.
Figure 14B:
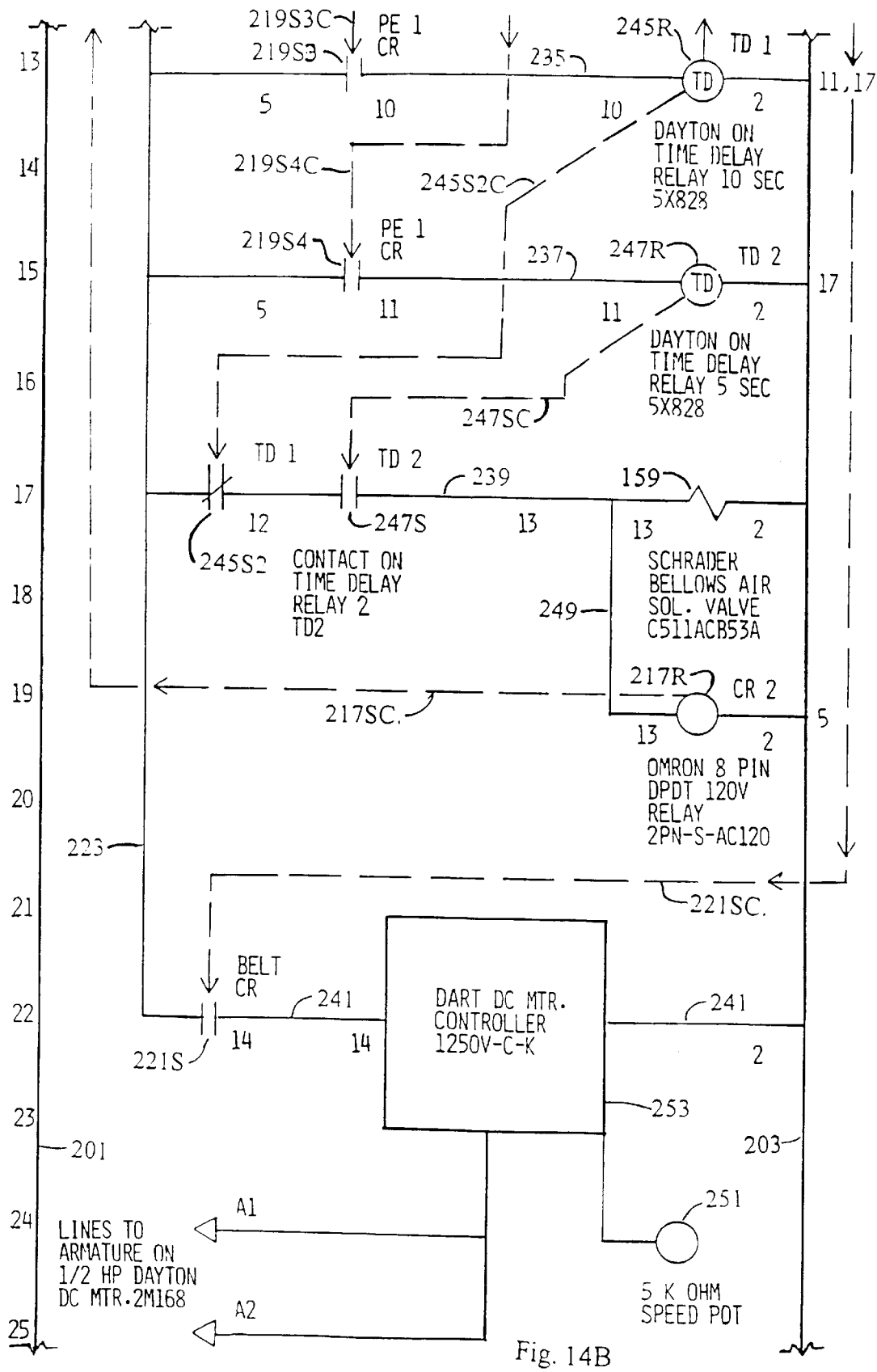

Referring now to FIGS. 14A and 14B of the drawings, there will be described the electrical system for controlling the apparatus of the invention. Leads 201 and 203 are coupled to a 120 volt AC source. Coupled across leads 201 and 203 is a lead 205 having a push-pull switch 207, a relay 209R, and a light 211. Also coupled across leads 201 and 203 is a lead 213 having a normally open switch 209S controlled by relay 209R, a normally closed switch 217S, a normally closed switch 219S1, and a relay 221R.

Another electrical lead 223 is connected to lead 213 between switches 209S and 217S. Coupled across leads 203 and 223 are leads 231, 233, 235, 237, 239, and 241. The photoelectric device PE1 is coupled to lead 231. Lead 233 includes a normally open switch PE1S and a relay 219R. A lead 243 having a normally closed switch 245S1 and a normally open switch 219S2 is coupled to leads 223 and 233. Lead 235 includes a normally open switch 219S3 and a time delay relay 245R. The time delay of relay 245R in one embodiment is 10 seconds. Lead 237 has a normally open switch 219S4 and a time delay relay 247R. The time delay of relay 247R in one embodiment is 5 seconds. Lead 239 has a normally closed switch 245S2, a normally open switch 247S and the solenoid valve 159. Lead 249 is connected to lead 239 and to lead 203 and includes a relay 217R. Coupled in lead 241 is a normally open switch 221S and a DC motor controller 253. The controller 253 converts AC to DC. Member 251 is a speed potentiometer for controlling unit 253. Leads A1 and A2 extends from unit 253 to control the conveyor motor 81.

Relay 209R controls switch 209S as shown by dotted line 209SC. Relay 221R controls switch 221S as shown by dotted line 221SC. The photoelectric device PE1 controls switch PE1S as shown by dotted line PE1C. Relay 219R controls switches 219S1, 219S2, 219S3, and 219S4 as shown by dotted lines 219S1C, 219S2C, 219S3C, and 219S4C. Relay 245R controls switches 245S1 and 245S2 as shown by dotted lines 245S1C and 245S2C.

Relay 247R controls switch 247S as shown by dotted line 247SC. Relay 217R controls switch 217S as shown by dotted line 217SC.

In the operation of the system, switch 207 is closed. This energizes the light 211 and actuates the relay 209R which closes the switch 209S. This allows relay 221R to energize which closes switch 221S to operate the conveyor motor 81 to operate the conveyor belt 61. When the photoelectric device PE1 detects a stack of tortillas 181, switch PE1S is closed momentarily and relay 219R is energized. This opens switch 219S1, and closes switches 219S2, 219S3, and 219S4. When switch 219S1 opens, the conveyor belt motor 81 stops. After a 5 second delay, relay 247R closes switch 247S which actuates the solenoid valve 159 to cause the cylinder 125 to move its piston 149 and member 153 downward to press the stack of tortillas against the blades 133 to cut the tortillas in the shape determined by the blades which then fall downward through the opening 121 onto the conveyor 185. After 5 more seconds, relay 245R opens switches 245S1 and 245S2. The solenoid valve 159 is de-energized and the piston 149 returns to its upward position. Relay 217R is de-energized and switch 217S closes. When switch 245S1 opens, the relay 219 is de-energized; switch 219S1 closes to cause the conveyor motor to operate; switch 245S2 closes and switches 219S3 and 219S4 open to de-energize the relays 245R and 247R.

It is to be understood that the invention may be employed to cut not only tortillas but other types of foods.

We claim:

1. A food cutting apparatus, comprising:

a food receiving means comprising structure having an upper end, a side entrance and a lower end with an exit opening, a conveyor means having first and second spaced apart ends with said second end located next to said side entrance and a conveyor belt supported to move around said first and second ends such that said belt has an upper surface movable from said first end toward said second end, cutting means coupled to lower end of said food receiving means in a position such that food may pass through said exit opening after being cut by said cutting means, a cylinder with a piston, coupled to said upper end of said food receiving means, said piston having an exterior portion with an engaging means, said cylinder and piston being located such that said piston with said engaging means may move toward and away from said cutting means, drive means for moving said conveyor belt for causing the upper surface of said conveyor belt to move toward said second end to carry food into said food receiving means by way of said food entrance to locate the food on said cutting means, control means for causing said cylinder to move said piston and hence said engaging means toward said cutting means to apply pressure to food on said cutting means to cause said cutting means to cut the food to allow the cut food to fall through said exit opening and for causing said cylinder to move said piston and hence said engaging means away from said cutting means.

2. The food cutting apparatus of claim 1, comprising:

detecting means for detecting the presence of food as it approaches said food receiving means for actuating said control means for causing said cylinder to move said piston and engaging means toward said cutting means.

3. The food cutting apparatus of claim 2:

wherein said control means when actuated by said detecting means causes said cylinder to move said piston and engaging means toward and away from said cutting means.

4. The food cutting apparatus of claim 1, comprising:

frame means for supporting said food receiving means, said conveyor means, said cylinder and piston, said drive means and said control means.

5. The food cutting apparatus of claim 3, comprising:

frame means for supporting said food receiving means, said conveyor means, said cylinder and piston, said drive means and said control means.

* * * * *